US012175859B2

(12) United States Patent
Dong et al.

(10) Patent No.: US 12,175,859 B2
(45) Date of Patent: Dec. 24, 2024

(54) TWO-WIRE COMMUNICATION CONTROL DEVICE AND MULTI-PURPOSE DEVICE

(71) Applicant: SHENZHEN INTELTRON INTELLIGENT SCIENCE & TECHNOLOGY CO., LTD., Guangdong (CN)

(72) Inventors: Xiaoyong Dong, Guangdong (CN); Zhixin Zhang, Guangdong (CN); Dongqing Huang, Guangdong (CN); Bo Tang, Guangdong (CN)

(73) Assignee: SHENZHEN INTELTRON INTELLIGENT SCIENCE & TECHNOLOGY CO., LTD., Guangdong (CN)

( * ) Notice: Subject to any disclaimer, the term of this patent is extended or adjusted under 35 U.S.C. 154(b) by 150 days.

(21) Appl. No.: 18/097,550

(22) Filed: Jan. 17, 2023

(65) Prior Publication Data

US 2023/0326332 A1 Oct. 12, 2023

(30) Foreign Application Priority Data

Apr. 7, 2022 (CN) ......................... 202210361668.3

(51) Int. Cl.
*G08C 19/12* (2006.01)

(52) U.S. Cl.
CPC .................................. *G08C 19/12* (2013.01)

(58) Field of Classification Search
CPC ...................................................... G08C 19/12
See application file for complete search history.

(56) References Cited

U.S. PATENT DOCUMENTS 10,954,948 B1 * 3/2021 Lowe .................. F04D 25/0606

FOREIGN PATENT DOCUMENTS

| | | | | | |
|---|---|---|---|---|---|
| CN | 104869706 | A | | 8/2015 | |
| CN | 105101574 | A | | 11/2015 | |
| CN | 110043502 | A | * | 7/2019 | ........... F04D 25/088 |
| CN | 110602826 | A | * | 12/2019 | |
| CN | 210343806 | U | | 4/2020 | |
| CN | 211474491 | U | | 9/2020 | |
| CN | 213814373 | U | * | 7/2021 | ......... G05B 19/0423 |
| CN | 215121260 | U | | 12/2021 | |

(Continued)

*Primary Examiner* — Curtis A Kuntz
*Assistant Examiner* — James E Munion
(74) *Attorney, Agent, or Firm* — Cooper Legal Group, LLC

(57) ABSTRACT

The present application relates a two-wire communication control device and a multi-purpose device. The two-wire communication control device includes a signal receiving module, a first control module, at least one second control module, a power supply module, a coding module, and a decoding module. The signal receiving module is connected to the first control module, the first control module is connected to the coding module, the coding module is connected to the power supply module, the decoding module is connected to the coding module, the decoding module is further connected to the second control module, the power supply module is connected to a live wire and a neutral wire, the power supply module is further connected the first control module and the second control module, one of the coding module and the decoding module is connected to the live wire, and the other is connected to the neutral wire.

8 Claims, 12 Drawing Sheets

(56) References Cited

FOREIGN PATENT DOCUMENTS

| | | | | |
|---|---|---|---|---|
| CN | 215259474 U | * 12/2021 | .............. | F21S 8/063 |
| CN | 215769407 U | * 2/2022 | | |
| TW | M246893 U | 10/2004 | | |

* cited by examiner

TWO-WIRE COMMUNICATION CONTROL DEVICE AND MULTI-PURPOSE DEVICE

CROSS-REFERENCE TO RELATED APPLICATION

This application claims the priority and benefit of Chinese patent application serial no. 202210361668.3, filed on Apr. 7, 2022. The entirety of Chinese patent application serial no. 202210361668.3 is hereby incorporated by reference herein and made a part of this specification.

TECHNICAL FIELD

The present application relates to a technical field of multi-purpose device and in particular, relates to a two-wire communication control device and a multi-purpose device.

BACKGROUND ART

With the development of the technology, more and more devices can be used for multiple purposes at present to realize an integration of function and structure. For example, the ceiling fan lamp is a perfect combination of the ceiling fan and lamp, which has not only a decorative function, but also a utility of fan.

In the multi-purpose device, the multi functions are controlled by a plurality of control chips. Four-wire control is generally adopted as the control manner in the multi-purpose device to realize the power supply and communications of the plurality of chips. For example, the control circuit board of the ceiling fan lamp generally requires a power supply wire for lamp panel, an earth wire, a signal wire and a power supply wire for lamp panel chip to form a four-wire control, so as to realize the control of the lamp and the ceiling fan. However, it has a large threading difficulty and a complicated installation process when mounting the multiple-purpose device adopting four-wire control manner.

SUMMARY

In order to reduce the threading difficulty, the present application provides a two-wire communication control device and a multi-purpose device.

In one aspect, a two-wire communication control device provided in the present application adopts the following technical solution:

A two-wire communication control device includes a signal receiving module, a first control module, at least one second control module, a power supply module, a coding module, and a decoding module.

The signal receiving module is connected to the first control module, the first control module is connected to the coding module, the coding module is connected to the power supply module, the decoding module is connected to the coding module, the decoding module is further connected to the second control module, the power supply module is separately connected to a live wire and a neutral wire, the power supply module is further separately connected to the first control module and the second control module, one of the coding module and the decoding module is connected to the live wire, and the other is connected to the neutral wire.

The power supply module is configured to supply power for the first control module and the second control module.

The signal receiving module is configured to receive an external control signal and transmit the external control signal to the first control module.

The first control module is configured to receive the external control signal, control, if the external control signal is a signal for controlling an action of an external first control member, the first control member to do an action according to the external control signal, or generate, if not, a first digital signal corresponding to the external control signal, and transmit the first digital signal to the coding module.

The coding module is configured to, in response to the first digital signal, code an alternating current source signal of the live wire, and generate a coding signal.

The decoding module is configured to decode the coding signal, generate a decoding signal, and transmit the decoding signal to the at least one second control module.

The second control module prestored with the decoding signal is configured to, in response to the decoding signal, control an external second control member to do an action.

In the above technical solution, the alternating current source signal of the live wire is coded by using the coding module, and the coding signal is decoded by the decoding module to obtain the decoding signal, so that the first control module and the second control module are communicated with each other only by the power wire, reducing the signal wires and reducing the mounting difficulty.

In some embodiments, it further includes a zero-crossing detecting module, an input port of the zero-crossing detecting module is connected to an output port of the coding module, a power supply input port of the zero-crossing detecting module is connected to an output port of the power supply module, and an output port of the zero-crossing detecting module is connected to the first control module.

The zero-crossing detecting module is configured to conduct a zero-crossing detection on the alternating current source signal of the live wire, generate a second digital signal, and transmit the second digital signal to the first control module.

The first control module is configured to generate the first digital signal according to the second digital signal.

In the above technical solution, the zero-crossing detecting module can detect the waveform of the alternating current source signal, and generate the second digital signal according to the waveform, facilitating the coding module to code according to the first digital signal.

In some embodiments, the coding module includes a silicon-controlled phase cut submodule, a power supply input port of the silicon-controlled phase cut submodule is connected to the output port of the power supply module, a signal control port of the silicon-controlled phase cut submodule is connected to the first control module.

The silicon-controlled phase cut submodule is configured to be switched on and chop the alternating current source signal of the live wire when the first digital signal is a high-level signal; or to be switched off to restore the alternating current source signal of the live wire when the first digital signal is a low-level signal. The silicon-controlled phase switching submodule is repeatedly switched on and/or off, and generates a coding signal.

In some embodiments, it further includes a first driving module, a control port of the first driving module is connected to the first control module, a power supply port of the first driving module is separately connected to the live wire and the neutral wire, an output port of the first driving module is connected to the first control member; and/or it further includes a second driving module, a control port of the second driving module is connected to the second control module, a power supply port of the second driving module is separately connected to the live wire and the neutral wire, an output port of the second driving module is connected to the second control member.

When the control member cannot be directly controlled to start by the control module, the driving module is introduced to realize the action of the control member, which is more convenient.

In some embodiments, the power supply module includes a rectification submodule, a first power supply submodule and a second power supply submodule, an input port of the rectification submodule is connected to the live wire and the neutral wire, an output port of the rectification submodule is connected to the first power supply submodule, an output port of the first power supply submodule is connected to the first control module, an input port of the second power supply submodule is connected to the coding module, an output port of the second power supply submodule is separately connected to the coding module and the second control module; and the rectification submodule is configured to rectifying the alternating current source signal of the live wire.

In some embodiments, it further includes a detecting module, an input port of the detecting module is connected to the second control module, an output port of the detecting module is connected to the first control module; and the detecting module is configured to detect whether the second control module outputs the control signal based on the first digital signal.

In some embodiments, the detecting module includes a relay control submodule and a signal detection submodule, a power supply input port of the relay control submodule is connected to the power supply module, a signal input port of the relay control submodule is connected to the second control module, an input port of the signal detection submodule is connected an output port of the relay control submodule, and an output port of the signal detection submodule is connected to the first control module.

In some embodiments, the detecting module further includes an amplification submodule, an input port of the amplification submodule is connected to the output port of the signal detection submodule, an output port of the amplification submodule is connected to the first control module; and the amplification submodule is configured to amplify a detecting signal of the signal detection submodule.

In the above technical solution, the amplification submodule amplifies the detecting signal when the detecting signal of the signal detection submodule is input in the amplification module. The amplified detecting signal is transmitted to the second control module, so as to realize a closed loop communication between the first control module and the second control module.

In second aspect, a multi-purpose device provided in the present application adopts the following technical solution:

a multi-purpose device includes the two-wire communication control device described in the first aspect, a first control member and a plurality of second control members, in which the first control member is connected to the first control module, and the second control member is connected to the second control module.

In some embodiments, the signal receiving module includes a wireless receiving module and/or a signal receiving terminal, the wireless receiving module is wirelessly connected to an external signaling device, and the signal receiving terminal is electrically connected to an external controller.

In conclusion, the present application includes at least one of the following beneficial effects:

1. the alternating current source signal of the live wire is coded by using the coding module, and the coding signal is decoded by the decoding module to obtain the decoding signal, so that the first control module and the second control module are communicated with each other only by the power wire, reducing the signal wires and reducing the mounting difficulty;
2. the zero-crossing detecting module can detect the waveform of the alternating current source signal, and generate the second digital signal according to the waveform, facilitating the coding module to code according to the first digital signal.

DETAILED DESCRIPTION

The present application is further described in detail below in combination with FIGS. 1-18 in order to make the purposes, technical solutions and advantages of the present application clearer. It should be understood that, the embodiments described herein are only used to explain the present application, but not intended to limited to the present application.

Figure 1:
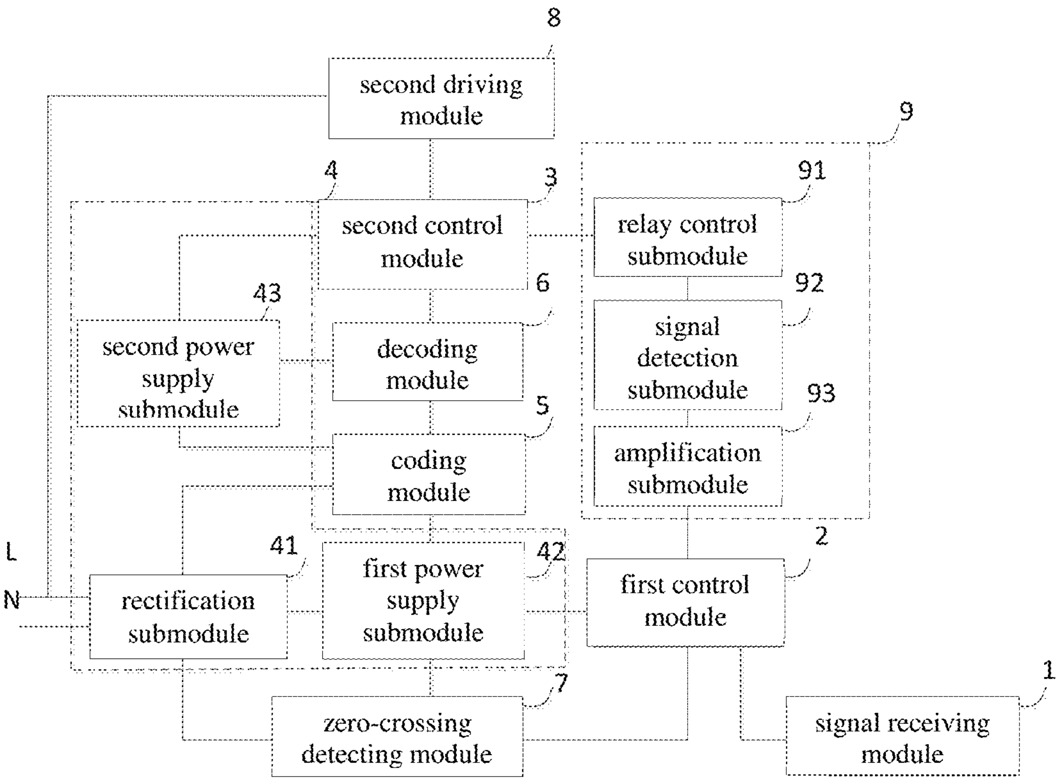
FIG. 1 is a block diagram according to an embodiment in the present application.

An embodiment of the present application discloses a two-wire communication control device. Referring to FIG. 1, the control device includes a signal receiving module 1, a first control module 2, one second control module 3, a power supply module 4, a coding module 5 and a decoding module 6. An input port of the power supply module 4 is connected to a alternating current source of 220V. An output port of the power supply module 4 is separately connected to the first control module 2 and the coding module 5. An output port of the first control module 2 is connected to a first control member. A signal input port of the first control module 2 is connected to the signal receiving module 1. A signal output port of the first control module 2 is connected to the coding module 5. An output port of the coding module 5 is separately connected to the decoding module 6 and the second control module 3. An output port of the second control module 3 is connected to a second control member.

When the first control module 2 receives an external control signal via the signal receiving module 1, the first control module 2 judges the external control signal. If the external control signal is configured to control the first control member, the first control module 2 controls the first control member to do an action according to the external control signal. Otherwise, the first control module 2 generates a coding signal according to the external control signal and transmits the coding signal to the coding module 5. The coding module 5 controls a first power supply signal of the 220V alternating current source according to the received coding signal, and generates a second power supply signal. The decoding module 6 decodes the second power supply signal to generate a decoding signal, and transmits the decoding signal to the second control module 3. Finally, the second control module 3 controls the second control member to do an action according to the decoding signal. When realizing the transmission of the external control signal from the first control module 2 to the second control module 3, the coding module 5 is only required to code the 220V alternating current source according to the coding signal generated by the first control module 2, which doesn't require adding signal wires to realize the communication between the first control module 2 and the second control module 3. In addition, the coding module 5 provides a power for the second control module 3, so as to use the power wire to realize the communication between the first control module 2 and the second control module 3, reducing the wires and mounting difficulty.

In this embodiment, the power supply module 4 includes a rectification submodule 41 and a first power supply submodule 42. An input port of the rectification submodule 41 is connected to the 220V alternating current source. An output port of the rectification submodule 41 is connected to the first power supply submodule 42. An output port of the first power supply submodule 42 is connected to the first control module 2.

Figure 2:
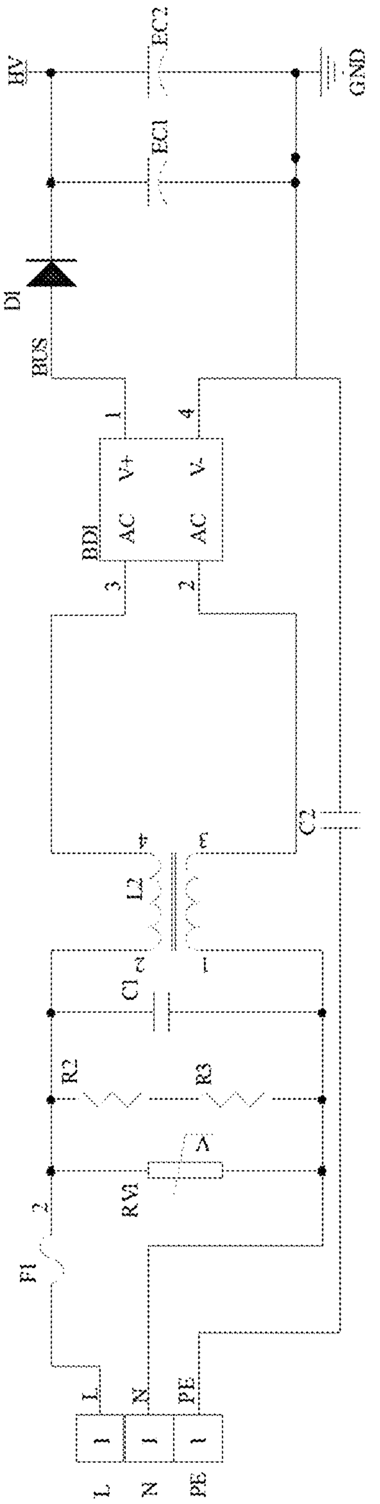
FIG. 2 is a circuit principal diagram of a rectification submodule according to an embodiment in the present application.

Referring to FIG. 1 and FIG. 2, specifically, the rectification submodule 41 includes a fuse F1, a slide rheostat RV1, a resistor R2, a resistor R3, a capacitor C1, a capacitor C2, a transformer L2, a rectification chip BD1, a diode D1, a capacitor EC1 and a capacitor EC2. One end of the fuse F1 is connected to a live wire L, the other end thereof is connected to a pin 2 of the transformer L2. The connection point between the fuse F1 and the transformer L2 is further separately connected to an end of the slide rheostat RV1, an end of the resistor R2 and an end of the capacitor C1. The other end of the slide rheostat RV1 is connected to a neutral wire N. The other end of the resistor R2 is connected to an end of the resistor R3. The other end of the resistor R3 is connected to the neutral wire N. The other end of the capacitor C1 is connected to the neutral wire N. The pin 1 of the transformer L2 is connected to the neutral wire N. The pin 3 of the transformer L2 is connected to an input port of the rectification chip BD1. The pin 4 of the transformer L2 is connected to the input port of the rectification chip BD1. A port V+ of the rectification chip BD1 is connected to an anode of the diode D1. A cathode of the diode D1 is connected to an output port HV of the rectification submodule 41. The cathode of the diode D1 is further separately connected to positive poles of the capacitor EC1 and the capacitor EC2. A negative pole of the capacitor EC1, a negative pole of the capacitor EC2 and a port V− of the rectification chip BD1 are all connected to a ground end GND. An end of the capacitor C2 is connected to a ground protection end PE, and the other end of the capacitor C2 is connected to the ground end GND.

When the power enters the rectification submodule 41 via the live wire, the transformer L2 is used to reduce the voltage. Then the voltage is input in the rectification chip BD1, and a voltage required by the communication control system is output from the output port HV. When the voltage is too large, the fuse F1 can protect the transformer L2 and the rectification chip BD1, improving the safety of the rectification submodule 41.

Figure 3:
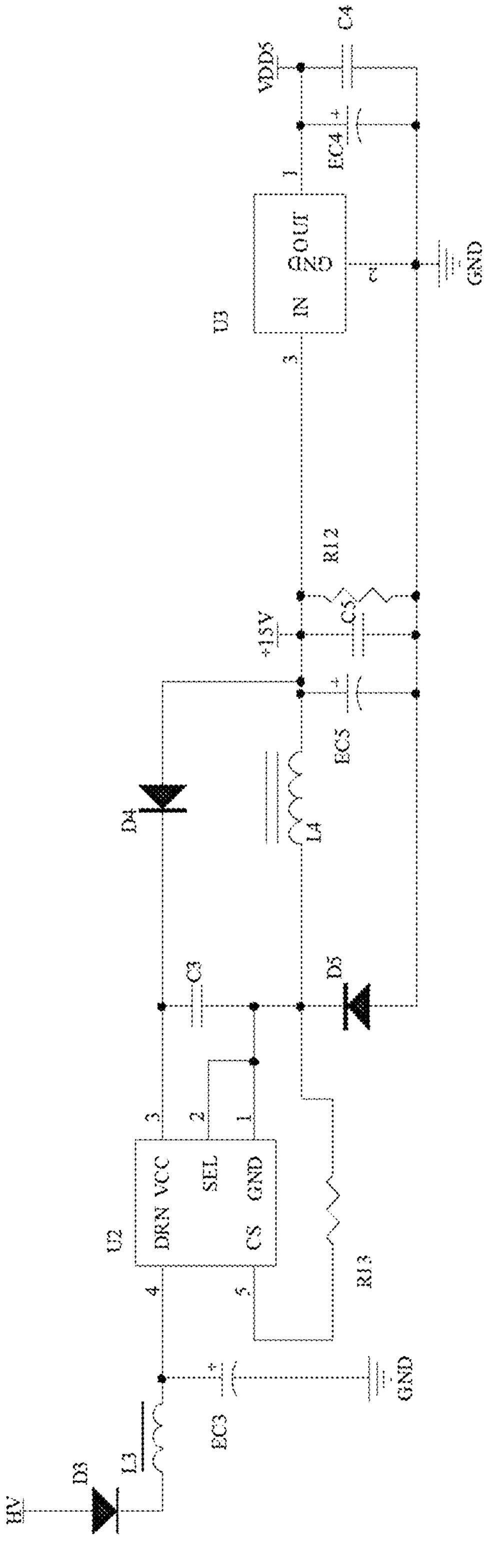
FIG. 3 is a circuit principal diagram of a first power supply submodule according to an embodiment in the present application.

Referring to FIG. 3, in this embodiment, the first power supply submodule 42 includes a diode D3, an inductor L3, a capacitor EC3, a first power supply chip U2, a capacitor C3, a diode D4, an inductor L4, a diode D5, a capacitor EC5, a capacitor C5, a resistor R12, a control chip U3 and a capacitor EC4. An anode of the diode D3 is connected to the output port HV of the rectification submodule 41. A cathode of the diode D3 is connected to an end of the inductor L3. The other end of the inductor L3 is separately connected to a pin DRN of the first power supply chip U2 and a positive pole of the capacitor EC3. A negative pole of the capacitor EC3 is connected to the ground end GND. A power supply port VCC of the first power supply chip U2 is connected to the cathode of the diode D4. A pin CS of the first power supply chip U2 is connected to an end of a resistor R13. The other end of the resistor R13 is connected to the cathode of the diode D5. A connection point between the power end VCC of the first power supply chip U2 and the cathode of the diode D4 is connected to an end of the capacitor C3. The other end of the capacitor C3 is separately connected to an anode of the diode D5, a pin SEL of the first power supply chip U2 and the ground end GND. The cathode of the diode D5 is further connected to an end of the inductor L4. The other end of the inductor L4 is separately connected to the anode of the diode D4 and an input port of the control chip U3. The anode of the diode D4 is separately connected to the positive pole of the capacitor EC5, an end of the capacitor C5, an end of the resistor R12 and a power supply output port +15V. The other end of the capacitor EC5, the other end of the capacitor C5 and the other end of the resistor R12 are further connected to the anode of the diode D5. The anode of the capacitor D5 is further connected to the ground end GND. The output port of the control chip U3 is separately connected to a power supply output end VDD5, an end of the capacitor EC4 and an end of the capacitor C4. The other end of the capacitor EC4 and the other end of the capacitor C4 are connected to the ground end GND.

The inductor L3 and the capacitor EC3 play a role of wave filtering on the power supply. An optional model of the first power supply chip U2 is BP2523, and an optional model of the control chip U3 is 78L05.

The alternating current source signal of the live wire passes the rectification submodule 41 to be rectified, and passes the first power supply submodule 42 to reduce the voltage and filter wave, so that the source signal is input in the first control module 2 via the power supply output end VDD5, to realizing the power supply for the first control module 2.

Figure 4:
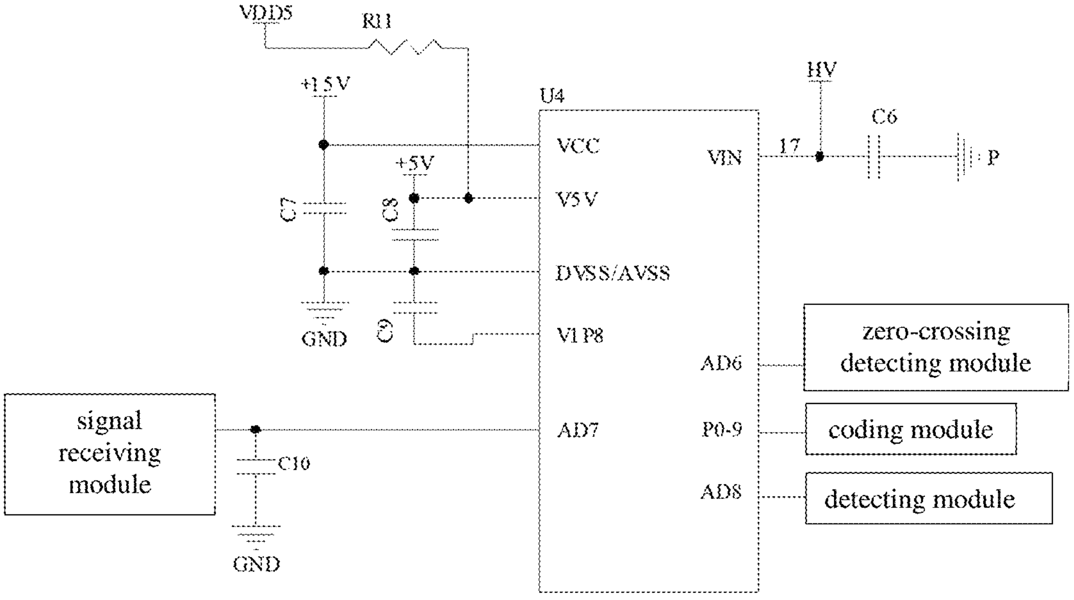
FIG. 4 is a circuit principal diagram of a first control module according to an embodiment in the present application.

Referring to FIG. 4, in this embodiment, the first control module 2 includes a control chip U4, a capacitor C6, a capacitor C7, a capacitor C8, a capacitor C9, a capacitor C10 and a resistor R11. An end VCC of the control chip U4 is connected to the power supply output end +15V. The end VCC of the control chip U4 is further connected to an end of the capacitor C7. The other end of the capacitor C7 is connected to the ground end GND. An end VIN of the control chip U4 is separately connected to a power supply output end HV and an end of the capacitor C6. The other end of the capacitor C6 is connected to the ground end GND. A pin V5V of the control chip U4 is connected to an end of the resistor R11. The other end of the resistor R11 is connected to the power supply output end VDD5. The pin V5V of the control chip U4 is further separately connected to an external reference power supply of +5V and an end of the capacitor C8. The other end of the capacitor C8 is connected to an end of the capacitor C9. The other end of the capacitor C9 is connected a pin VIP8 of the control chip U4. A pin AD7 of the control chip U4 is separately connected to the capacitor C10 and the signal receiving module 1. The other end of the capacitor C10 is connected to the ground end GND.

The power supply output end HV, the power supply output end VDD5 and the power supply output end +15V all provide power supply for the control chip U4. An optional model of the control chip U4 is RT7056.

Figure 5:
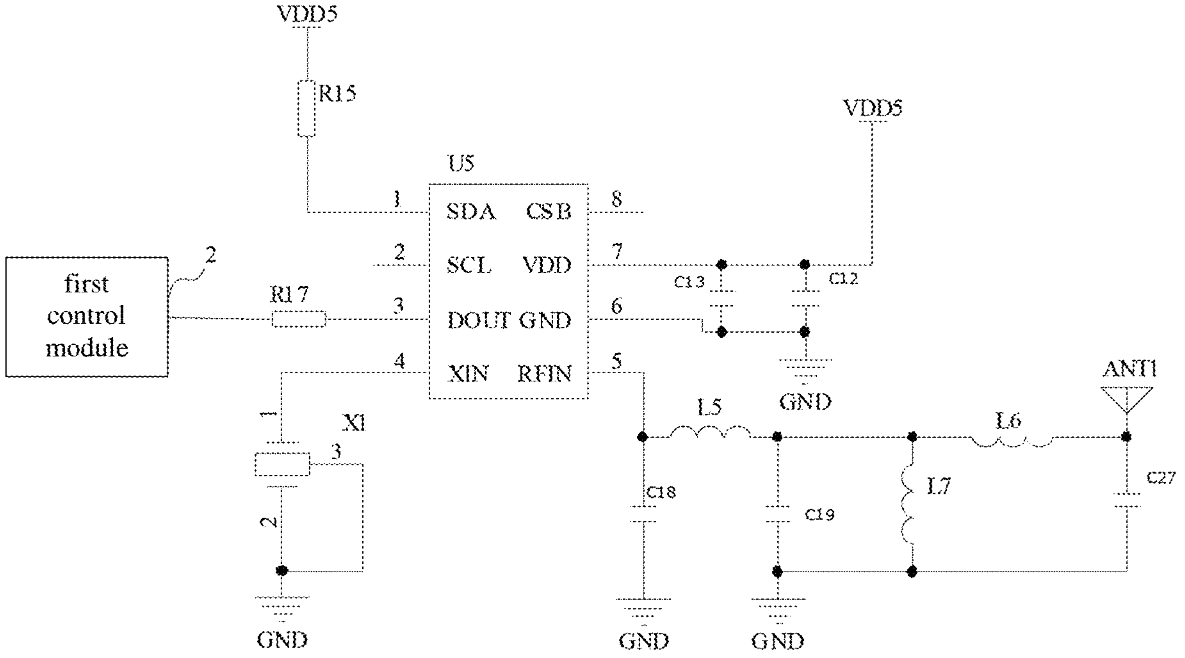
FIG. 5 is a circuit principal diagram of a signal receiving module according to an embodiment in the present application.

Referring to FIG. 5, further, the signal receiving module 1 includes a control chip U5, a resistor R15, a resistor R17, a capacitor C13, a capacitor C12, a capacitor C18, a capacitor C19, a capacitor C27, an inductor L5, an inductor L7, an inductor L6 and a crystal oscillator XI. A pin SDA of the control chip U5 is connected to an end of the resistor R15. The other end of the resistor R15 is connected to the power supply output end VDD5. A pin VDD of the control chip U5 is separately connected to the capacitor C13, the capacitor C12 and the power supply output end VDD5. A pin GND of the control chip U5 is separately connected to the capacitor C13, the capacitor C12 and the ground end GND. A pin RFIN of the control chip U5 is separately connected to an end of the capacitor C18 and an end of the inductor L5. The other end of the capacitor C18 is connected to the ground end GND. The other end of the inductor L5 is separately connected to an end of the capacitor C19, an end of the capacitor L6 and an end of the inductor L7. The other end of the capacitor C19 and the other end of the inductor L7 are both connected to the ground end. The other end of the inductor L6 is separately connected to an aerial ANTI and an end of the capacitor C27. The other end of the capacitor C27 is connected to the ground end. A pin XIN of the control chip U5 is connected to a pin 1 of the crystal oscillator XI. Pins 2 and 3 of the crystal oscillator XI are both connected to the ground end GND. A pin DOUT of the control chip U5 is connected to an end of the resistor R17. The other end of the resistor R17 is connected to a pin AD7 of the control chip U4. In this embodiment, an optional model of the control chip U5 is CMT2210LB.

Referring to FIG. 1, in this embodiment, a zero-crossing detecting module 7 is further included. An input port of the zero-crossing detecting module 7 is connected to an output port of the silicon-controlled phase cut submodule. A power supply input port of the zero-crossing detecting module 7 is connected to the output port of the power supply module 4. An output port of the zero-crossing detecting module 7 is connected to the first control module 2.

The zero-crossing detecting module 7 is configured to conduct a zero-cross detection on the alternating current source signal of the live wire, generate a second digital signal, and transmit the second digital signal to the first control module 2.

The first control module 2 generates a first digital signal according to the second digital signal.

Figure 6:
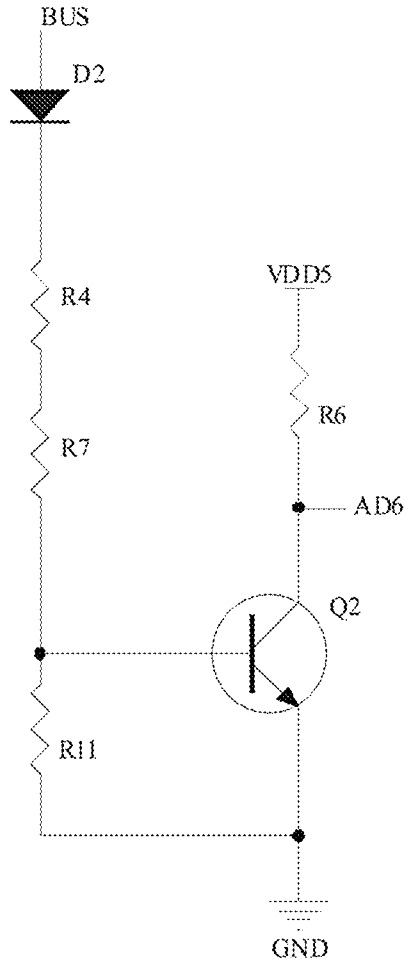
FIG. 6 is a circuit principal diagram of a zero-crossing detecting module according to an embodiment in the present application.

Referring to FIG. 6, specifically, the zero-crossing detecting module 7 includes a resistor R4, a diode D2, a resistor R7, a resistor R6, a resistor R11 and a triode Q2. An anode of the diode D2 is connected to the coding module 5. The cathode of the diode D2 is connected to an end of the resistor R4. The other end of the resistor R4 is connected to an end of the resistor R7. The other end of the resistor R7 is separately connected to a base electrode of the triode Q2 and an end of the resistor R11. The other end of the resistor R11 is connected to the ground end GND. An emitter electrode of the triode Q2 is connected to the ground end GND. A collector electrode of the triode Q2 is connected to an end of the resistor R6. The other end of the resistor R6 is connected to the power supply output end VDD5. The collector electrode of the triode Q2 is further connected to a pin AD6 of the control chip U4.

In this embodiment, the coding module 5 can be a silicon-controlled phase cut submodule. A power supply input port of the silicon-controlled phase cut submodule is connected to the output port of the power supply module 4. A signal control port of the silicon-controlled phase cut submodule is connected to the first control module 2.

The silicon-controlled phase cut submodule is configured to be switched on and chop the alternating current source signal of the live wire when the first digital signal is a high-level signal within a first determined time. When the first digital signal is a low-level signal with in a second determined time, the silicon-controlled phase cut submodule is switched off to restore the alternating current source signal of the live wire. The silicon-controlled phase cut submodule is repeatedly switched on/off, and generates the coding signal.

The coding module 5 can also adopt MOS phase switching circuit as another optional implementation of this embodiment.

Figure 7:
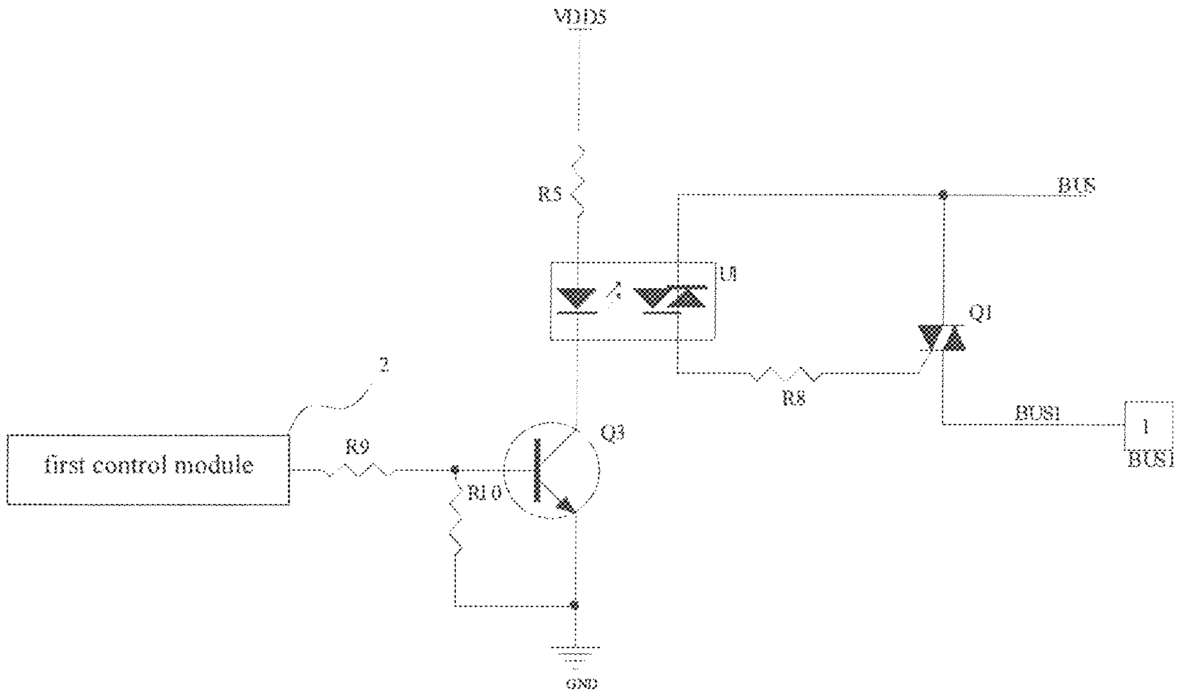
FIG. 7 is a circuit principal diagram of a coding module according to an embodiment in the present application.

Referring to FIG. 7, specifically, the silicon-controlled phase cut submodule includes a resistor R5, a silicon-controlled rectifier U1, a resistor R8, a resistor R9, a resistor R10, a bidirectional thyristor Q1 and a triode Q3. An end of the resistor R5 is connected to the power supply output end VDD5. The other end of the resistor R5 is connected to a pin 1 of the silicon-controlled rectifier U1. A pin 2 of the rectifier U1 is connected to a collector electrode of triode Q3. A base electrode of the triode Q3 is separately connected to an end of the resistor R9 and an end of the resistor R10. The other end of the resistor R9 is connected to a pin P0-9 of the control chip U4. The other end of the resistor R10 is connected to the ground end GND. An emitter electrode of the triode Q3 is connected to the ground end GND. A pin 3 of the silicon-controlled rectifier U1 is connected to an output port BUS. A pin 4 of the silicon-controlled rectifier U1 is connected to an end of the resistor R8. The other end of the resistor R8 is connected to a control end of the bidirectional thyristor Q1. One end of the bidirectional thyristor Q1 is connected to an output port BUS1, and the other end of the bidirectional thyristor Q1 is connected to the output port BUS.

When the signal receiving module 1 receiving the external control signal, the aerial receives the external control signal, and transmits the external control signal to the control chip U5. The control chip U5 transmits the received external control signal to the first control module 2 via the pin DOUT.

The first control module 2 judges according to the received external control signal. If the external control signal is a signal for controlling an action of an external first control member, the first control module 2 controls the first control member to do an action. Otherwise, the first control module 2 generates a first digital signal according to the external control signal, and transmits the first digital signal to the coding module 5.

Figure 8:
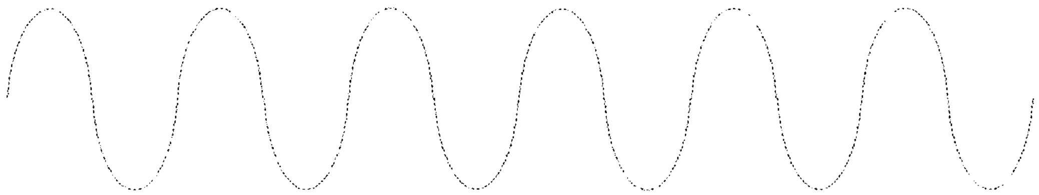
FIG. 8 is an oscillogram of an alternating current source signal before chopping according to an embodiment in the present application.
Figure 9:
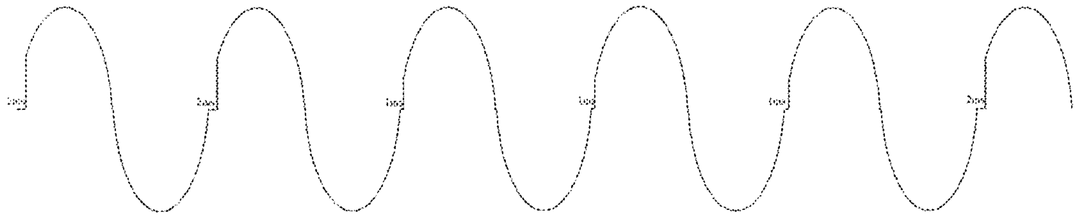
FIG. 9 is an oscillogram of an alternating current source signal after chopping according to an embodiment in the present application.
Figure 10:
FIG. 10 is an oscillogram of a coding signal according to an embodiment in the present application.

Referring to FIG. 8, FIG. 9 and FIG. 10, when the first digital signal is required to transmit to the coding module 5, the zero-crossing detecting module 7 conducts a zero-crossing detection on the alternating current source of the live wire, generates a second digital signal, and transmits it to the first control module 2 via the collector electrode of the triode Q2. The first control module 2 transmit the first digital signal to the coding module 5 according to the received second digital signal. The coding module 5 controls the triode Q3 to be conducted or cutoff according to the received first digital signal. When the triode Q3 is conducted, the silicon-controlled rectifier U1 chops the alternating current source signal of the live wire. When the triode Q3 is cutoff, the silicon-controlled rectifier U1 is also keep in a cutoff state, and the alternating current source signal of the live wire is restored. The triode Q3 is constantly conducted or cutoff according to the first digital signal, continuously chops the alternating current source signal of the live wire, so as to generate the coding signal corresponding to the first digital signal.

Referring to FIG. 1, in this embodiment, the power supply module 4 further includes a second power supply submodule 43. An input port of the second power supply submodule 43 is connected to the coding module 5. An output port of the second power supply submodule 43 is separately connected to the decoding module 6 and the second control module 3.

Figure 11:
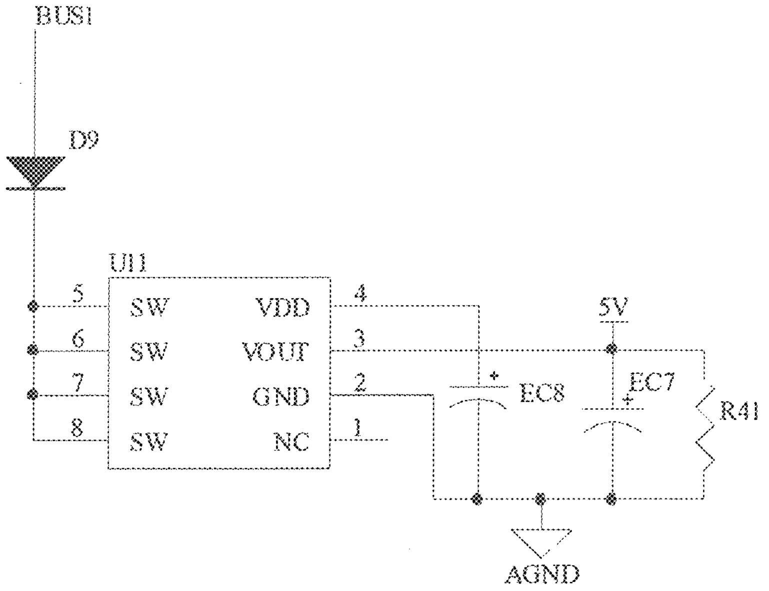
FIG. 11 is a circuit principal diagram of a second power supply submodule according to an embodiment in the present application.

Referring to FIG. 11, specifically, the second power supply submodule 43 includes a control chip U11, a diode D9, a capacitor EC8, a capacitor EC7 and a resistor R41. An anode of the diode D9 is connected to an output end BUS1 of the coding module 5. The cathode of the diode D9 is connected to a pin SW of the control chip U11. A pin VDD of the control chip U11 is connected to a positive pole of the capacitor EC8. A negative pole of the capacitor EC8 is connected to the ground end AGND. A pin VOUT of the control chip U11 is separately connected to a positive pole of the capacitor EC7, an end of the resistor R41 and an output end 5V. A negative pole of the capacitor EC7 is connected to AGND. The other end of the resistor R41 is connected to the ground end AGND. A pin GND of the control chip U11 is connected to the ground end GND.

Figure 12:
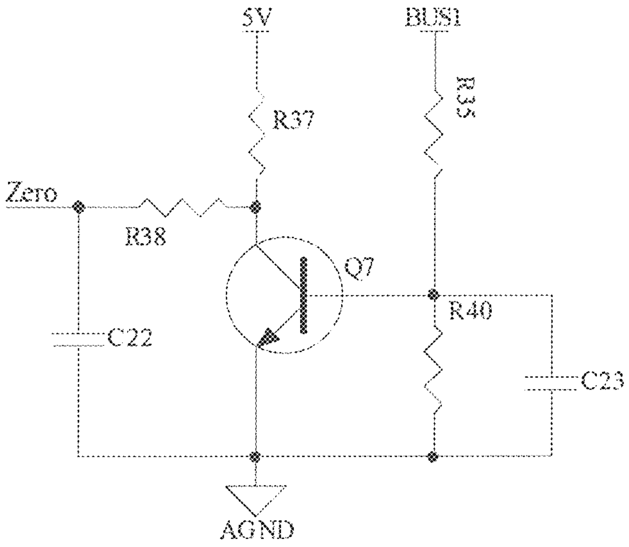
FIG. 12 is a circuit principal diagram of a decoding module according to an embodiment in the present application.

Referring to FIG. 12, specifically, the decoding module 6 includes a resistor R37, a resistor R35, a resistor R40, a resistor R38, a capacitor C22, a capacitor C23 and a triode Q7. An end of the resistor R35 is connected to an output end BUS1. The other end of the resistor R35 is separately connected to an end of the resistor R40, an end of the capacitor C23 and a base electrode of the triode Q7. The other end of the resistor R40 and the other end of the capacitor C23 are both connected to the ground end AGND. An emitter electrode of the triode Q7 is connected to the ground end AGND. A base electrode of the triode Q7 is separately connected to an end of the resistor R38 and an end of the resistor R37. The other end of the resistor R37 is connected to an output end of 5V. The other end of the resistor R38 is separately connected to the second control module 3 and the capacitor C22. The other end of the capacitor is connected to the ground end AGND.

Figure 13:
FIG. 13 is an oscillogram of a decoding signal according to an embodiment in the present application.

Referring to FIG. 13, if a high level of the coding signal is input to the base electrode of the triode Q7 via the output end BUS1, the triode Q7 is conducted. The high level signal is transmitted to the second control module 3. If a low level of the coding signal is input to the base electrode of the triode Q7 via the output end BUS1, the triode Q7 is cutoff. The low level signal is transmitted to the second control module 3, so as to realize decoding of the coding signal, and the coding signal is transmitted to the second control module 3.

Referring to FIG. 1, a second driving module 8 is further included as an optional of the embodiment. A control end of the second driving module 8 is connected to the second control module 3. A power supply port of the second driving module 8 is separately connected to the live wire and the neutral wire. An output port of the second driving module 8 is connected to the second control member.

Figure 14:
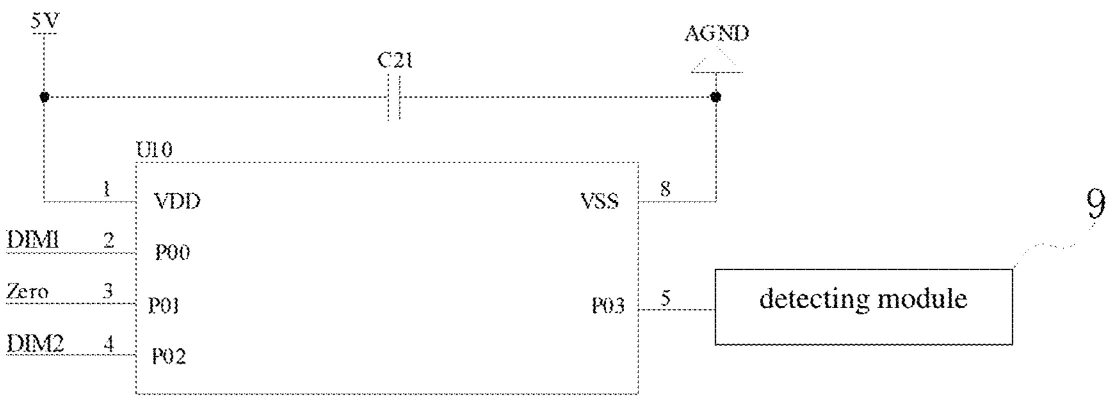
FIG. 14 is a circuit principal diagram of a second control module according to an embodiment in the present application.

Referring to FIG. 14, in this embodiment, the second control module 3 includes a control chip U10 and a capacitor C21. A pin P01 of the control chip U10 is connected to the collector electrode of the triode Q7. A pin VDD of the control chip U10 is separately connected to an output end of 5V and an end of the capacitor C21. A pin VSS of the control chip U10 is connected to the ground end AGND. The other end of the capacitor C21 is connected to the pin VSS of the control chip U10. A pin P00 and a pin P02 of the control chip U10 are both connected to the driving module. In this embodiment, an optional model of the control chip U10 is SN8F5701SG.

Figure 15:
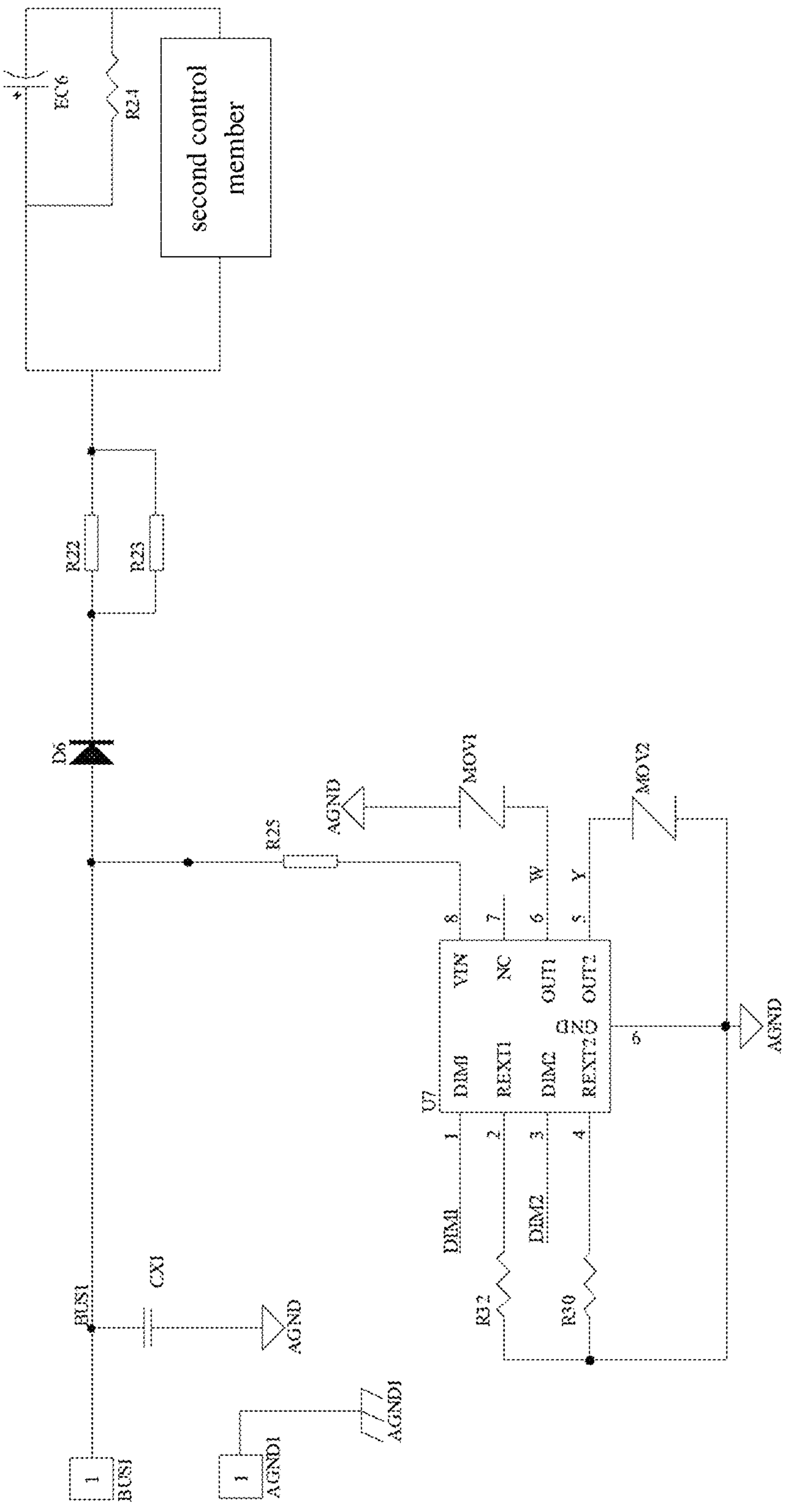
FIG. 15 is a circuit principal diagram of a second driving module according to an embodiment in the present application.

Referring to FIG. 15, in this embodiment, the second driving module 8 includes a control chip U7, a capacitor CX1, a resistor R22, a resistor R23, a diode D5, a resistor R32, a resistor R30, a resistor R25, a capacitor EC6, a resistor R24, a varistor MOV1 and a varistor MOV2. A pin DIM1 of the control chip U7 is connected to the pin P00 of the control chip U10. A pin DIM2 of the control chip U7 is connected to a pin P02 of the control chip U10. A pin REXT1 of the control chip U7 is connected to an end of the resistor R32. The other end of the resistor R32 is connected to the ground end AGND. A pin REXT2 of the control chip U7 is connected to an end of the resistor R30. The other end of the resistor R30 is connected to the ground end AGND. A pin OUT1 of the control chip U7 is connected to an end of the varistor MOV1. The other end of the varistor MOV1 is connected to the ground end AGND. A pin OUT2 of the control chip U7 is connected to an end of the varistor MOV2. The other end of the varistor MOV2 is connected to the ground end AGND. A pin VIN of the control chip U7 is connected to an end of the resistor R25. The other end of the resistor R25 is separately connected to an output end BUS1, an anode of the diode D6 and an end of the capacitor CX1. The other end of the capacitor CX1 is connected to the ground end AGND. A cathode of the diode D6 is separately connected to the resistor R22 and the resistor R23. The other end of the resistor R22 is separately connected to an end of the capacitor EC6, an end of the resistor R24, an end of the capacitor EC10, an end of the resistor R46 and the second control member. The other end of the resistor R23 is separately connected to an end of the capacitor EC6, an end of the resistor R24, an end of the capacitor EC10, an end of the resistor R46, and the second control member. The cathode of the capacitor EC6 and the other end of the resistor R24 are both connected to the second control member.

The capacitor EC6 and the resistor R24 control the second control member to filter wave. An optional model of the control chip U7 is ICNE2530.

Referring to FIG. 1, in this embodiment, a detecting module is further included. An input port of the detecting module 9 is connected to the second control module 3. An output port of the detecting module 9 is connected to the first control module 2.

The detecting module 9 is configured to detect whether the second control module 3 outputs the control signal according to a square wave signal.

Specially, the detecting module 9 includes a relay control submodule 91, a signal detection submodule 92 and an amplification submodule 93. A power supply input port of the relay control submodule 91 is connected to the power supply module 4. A signal input port of the relay control submodule 91 is connected to the second control module 3. An output port of the relay control submodule 91 is connected to the signal detection submodule 92.

An input port of the signal detection submodule 92 is connected to the output port of the relay control submodule 91. An output port of the signal detection submodule 92 is connected to the first control module 2.

An input port of the amplification submodule 93 is connected to the output port of the signal detection submodule 92. The output of the amplification submodule 93 is connected to the first control module 2.

The amplification submodule 93 is configured to amplify the detecting signal of the signal detection submodule 92.

Figure 16:
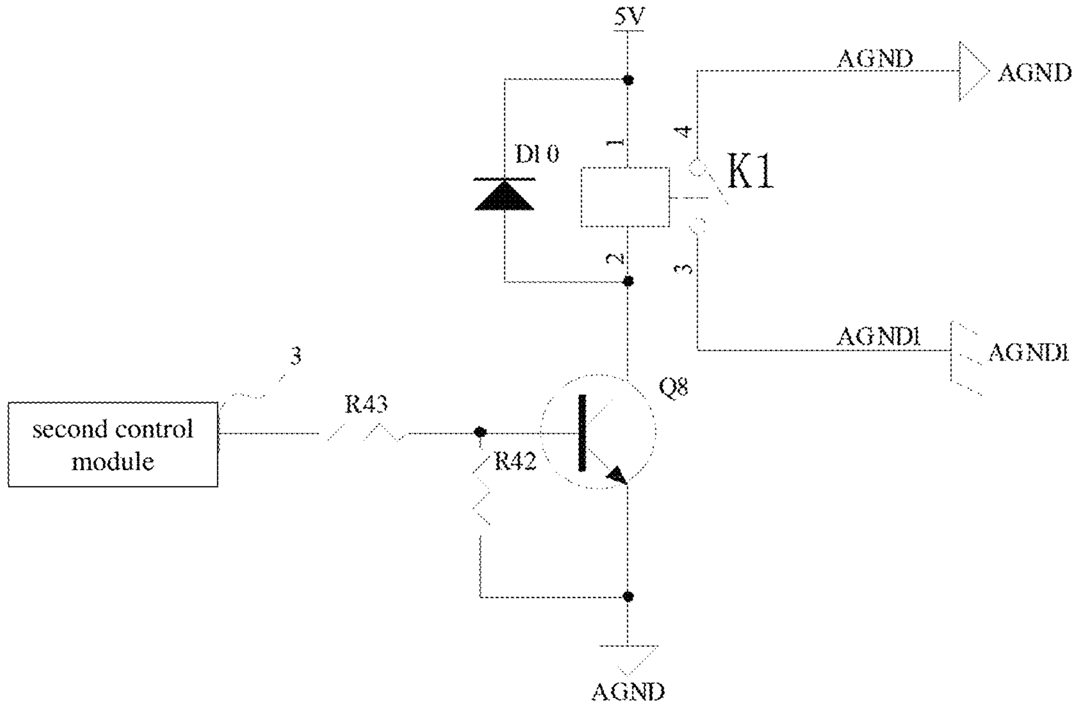
FIG. 16 is a circuit principal diagram of a relay control submodule according to an embodiment in the present application.

Referring to FIG. 16, in this embodiment, the relay control submodule 91 includes a diode D10, a relay K1, a triode Q8, a resistor R42 and a resistor R43. A contactor 1 of the relay K1 is separately connected to an output end of 5V and a cathode of the diode D10. A contactor 2 of the relay K1 is separately connected to an anode of the diode D10 and a collector electrode of the triode Q8. A contactor 3 of the relay K1 is connected to the ground end AGND. A contactor 4 of the relay K1 is connected to the ground end AGND. A base electrode of the triode Q8 is separately connected to an end of the resistor R43 and an end of the resistor R42. The other end of the resistor R42 and an emitter electrode of the triode Q8 are both connected to the ground end AGND. The other end of the resistor R43 is connected to a pin P03 of the second control module 3.

The pins 1 and 2 of the relay K1 are the coils of the relay K1. The pins 3 and 4 of the relay K1 are the normally open auxiliary contactors of the relay K1.

Figure 17:
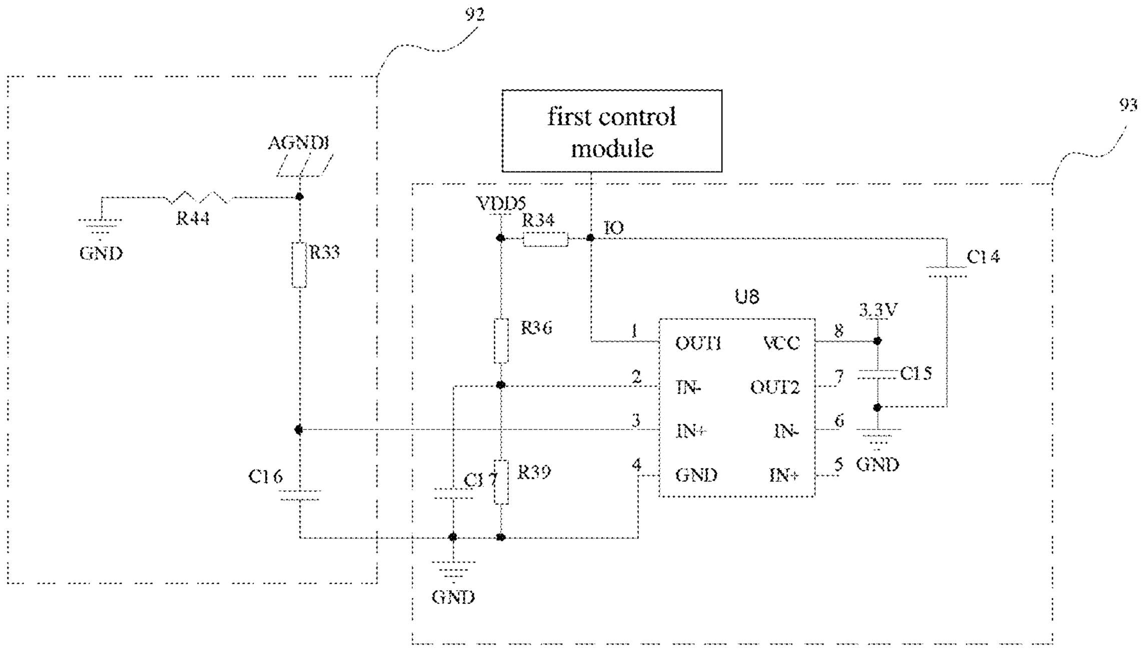
FIG. 17 is a circuit principal diagram of a signal detection submodule and an amplification submodule according to an embodiment in the present application.

Referring to FIG. 17, in this embodiment, the signal detection submodule 92 includes a resistor R44, a resistor R33 and a capacitor C16. An end of the resistor R44 is connected to the ground end GND. The other end of the resistor R44 is separately connected to a ground end AGND1 and an end of the resistor R33. The other end of the resistor R33 is connected to the capacitor C16. The other end of the capacitor C16 is connected to the ground end GND. The connection point between the resistor R33 and the capacitor C16 is connected to the amplification submodule 93.

The amplification submodule 93 includes a control chip U8, a resistor R39, a capacitor C17, a resistor R35, a resistor R34, a capacitor C14 and a capacitor C15. A pin IN+ of the control chip U8 is connected to the signal detection submodule 92. A pin IN− of the control chip U8 is separately connected to a resistor R36, a resistor R39 and a capacitor C17. The other end of the resistor R39 and the other end of the capacitor C17 are both connected to the ground end. The other end of the resistor R36 is separately connected to a power supply output end VDD5 and an end of the resistor R34. The other end of the resistor R34 is separately connected to a pin OUT of the control chip U8 and an end of the capacitor C14. The other end of the capacitor C14 is separately connected to an end of the capacitor C15 and the ground end GND. The other end of the capacitor C15 is separately connected to a pin VCC of the control chip U8 and an external reference signal of 3.3V. A pin OUT of the control chip U8 is further connected to the pin AD8 of the control chip U4. In this embodiment, an optional model of the control chip U8 is ICE2530.

When the detecting module 9 detects whether the second control module 3 outputs control signal according to the first digital signal, if the second control module 3 outputs the control signal, the triode Q3 is conducted, the coils of the relay K1 are energized. The normally open auxiliary contactors of the relay K1 are closed, so that the ground end AGND is conducted to the ground end GND, the signal detection submodule 92 detects a conductive signal between the ground end AGND and the ground GND, the signal is input in the control chip U8 via the pin IN+ of the control chip U8, and is input in the first control module 2 via the pin OUT of the control chip U8 after the amplification by control chip U8, so as to realize a closed-loop communication between the first control module 2 and the second control module 3.

Figure 18:
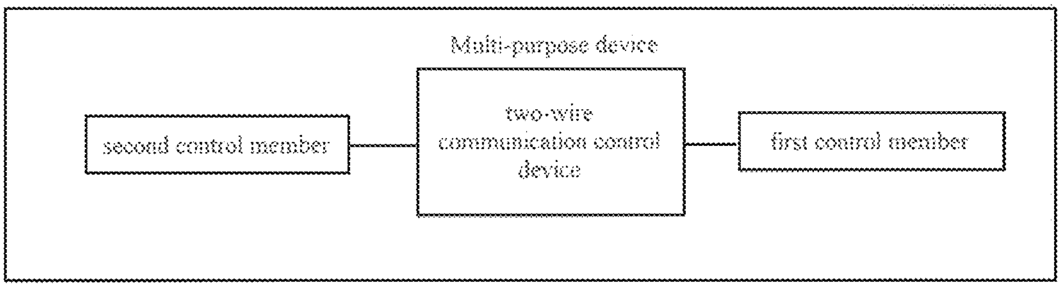
FIG. 18 is a block diagram of a multi-purpose device according to an embodiment in the present application.

The present application further discloses a multi-purpose device. Referring to FIG. 18, the multi-purpose device includes a two-wire communication control device, a first control member and a plurality of second control members. The first control member is connected to the first control module 2. The second control member is connected to the second control module 3.

When the two-wire communication control device receives the external control signal, if the external control signal is configured to control the first control member to act, the two-wire communication control device control the first control member to do an action according to the external control signal. Otherwise, the two-wire communication control device controls the second control member to do an action according to the external control signal.

In this embodiment, the signal receiving module 1 includes a wireless receiving module and/or a signal receiving terminal. The wireless receiving module is wirelessly connected to an external signaling device, and the signal receiving terminal is electrically connected to an external controller.

The wireless receiving module adopts a Bluetooth® or WIFI.

The above are the preferred embodiments of the present application, which are not intended to limit the protection scope of the present application. Any feature disclosed in the specification (including abstract and drawings), unless specifically state, can be replaced by the other equivalents or replacing features with similar purposes. That is, unless specifically state, each feature is an example of a series of equivalents or similar features.

What is claimed is:

1. A two-wire communication control device comprising: a signal receiving module, a first control module, at least one second control module, a power supply module, a coding module, a decoding module, and a detecting module, wherein the signal receiving module is connected to the first control module, the first control module is connected to the coding module, the coding module is connected to the power supply module, the decoding module is connected to the coding module, the decoding module is further connected to the at least one second control module, the power supply module is separately connected to a live wire and a neutral wire, the power supply module is further separately connected to the first control module and the at least one second control module, one of the coding module or the decoding module is connected to the live wire, and the other of the coding module or the decoding module is connected to the neutral wire;

the power supply module is configured to supply power for the first control module and the at least one second control module;

the signal receiving module is configured to receive an external control signal and transmit the external control signal to the first control module;

the first control module is configured to receive the external control signal, control, when the external control signal is a signal for controlling an action of an external first control member, the external first control member to act according to the external control signal, or generate, when not, a first digital signal corresponding to the external control signal, and transmit the first digital signal to the coding module;

the coding module is configured to, in response to the first digital signal, code an alternating current source signal of the live wire and generate a coding signal;

the decoding module is configured to decode the coding signal, generate a decoding signal, and transmit the decoding signal to the at least one second control module;

the at least one second control module is configured to, in response to the decoding signal, control an external second control member to do an action;

an input port of the detecting module is connected to the at least one second control module, and an output port of the detecting module is connected to the first control module;

the detecting module is configured to detect whether the at least one second control module outputs the external control signal based on the first digital signal; and the detecting module comprises a relay control submodule and a signal detection submodule, a power supply input port of the relay control submodule is connected to the power supply module, a signal input port of the relay control submodule is connected to the at least one second control module, an input port of the signal detection submodule is connected an output port of the relay control submodule, and an output port of the signal detection submodule is connected to the first control module.

2. The two-wire communication control device according to claim 1, further comprising a zero-crossing detecting module, wherein an input port of the zero-crossing detecting module is connected to an output port of the coding module, a power supply input port of the zero-crossing detecting module is connected to an output port of the power supply module, and an output port of the zero-crossing detecting module is connected to the first control module; and the zero-crossing detecting module is configured to conduct a zero-crossing detection on the alternating current source signal of the live wire, generate a second digital signal, and transmit the second digital signal to the first control module.

3. The two-wire communication control device according to claim 2, wherein the coding module comprises a silicon-controlled phase cut submodule, wherein a power supply input port of the silicon-controlled phase cut submodule is connected to the output port of the power supply module, and a signal control port of the silicon-controlled phase cut submodule is connected to the first control module; and the silicon-controlled phase cut submodule is configured to be switched on and chop the alternating current source signal of the live wire when the first digital signal is a high-level signal, or to be switched off to restore the alternating current source signal of the live wire when the first digital signal is a low-level signal.

4. The two-wire communication control device according to claim 1, further comprising at least one of:

a first driving module, wherein a control port of the first driving module is connected to the first control module, a power supply port of the first driving module is separately connected to the live wire and the neutral wire, and an output port of the first driving module is connected to the external first control member; or a second driving module, wherein a control port of the second driving module is connected to the at least one second control module, a power supply port of the second driving module is separately connected to the live wire and the neutral wire, and an output port of the second driving module is connected to the external second control member.

5. The two-wire communication control device according to claim 1, wherein the power supply module comprises a rectification submodule, a first power supply submodule and a second power supply submodule, an input port of the rectification submodule is connected to the live wire and the neutral wire, an output port of the rectification submodule is connected to the first power supply submodule, an output port of the first power supply submodule is connected to the first control module, an input port of the second power supply submodule is connected to the coding module, and an output port of the second power supply submodule is separately connected to the decoding module and the at least one second control module; and the rectification submodule is configured to rectify the alternating current source signal of the live wire.

6. The two-wire communication control device according to claim 1, wherein the detecting module further comprises an amplification submodule, an input port of the amplification submodule is connected to the output port of the signal detection submodule, and an output port of the amplification submodule is connected to the first control module; and the amplification submodule is configured to amplify a detecting signal of the signal detection submodule.

7. A multi-purpose device, comprising the two-wire communication control device according to claim 1, wherein the external first control member is connected to the first control module, and the external second control member is connected to the at least one second control module.

8. The multi-purpose device according to claim 7, wherein: the signal receiving module comprises at least one of a wireless receiving module or a signal receiving terminal, and wherein the wireless receiving module is wirelessly connected to an external signaling device, or the signal receiving terminal is electrically connected to an external controller.

* * * * *